United States Patent
Geerlings et al.

(10) Patent No.: US 11,954,050 B2
(45) Date of Patent: Apr. 9, 2024

(54) SYSTEM AND METHOD FOR DIRECT MEMORY ACCESS

(71) Applicant: NXP USA, Inc., Austin, TX (US)

(72) Inventors: Jurgen Geerlings, Suzhou (CN); Yang Liu, Suzhou (CN); Zhijun Chen, Suzhou (CN)

(73) Assignee: NXP USA, Inc., Austin, TX (US)

( * ) Notice: Subject to any disclaimer, the term of this patent is extended or adjusted under 35 U.S.C. 154(b) by 360 days.

(21) Appl. No.: 17/301,724

(22) Filed: Apr. 13, 2021

(65) Prior Publication Data

US 2021/0357337 A1 Nov. 18, 2021

(30) Foreign Application Priority Data

May 15, 2020 (CN) .......................... 202010417550.9

(51) Int. Cl.
| | | |
|---|---|---|
| *G06F 13/00* | (2006.01) | |
| *G06F 12/02* | (2006.01) | |
| *G06F 12/0831* | (2016.01) | |
| *G06F 13/16* | (2006.01) | |
| *G06F 13/30* | (2006.01) | |

(52) U.S. Cl.
CPC ...... *G06F 13/1668* (2013.01); *G06F 12/0238* (2013.01); *G06F 12/0835* (2013.01); *G06F 13/1626* (2013.01); *G06F 13/30* (2013.01)

(58) Field of Classification Search
CPC .. G06F 12/00; G06F 12/0238; G06F 12/0835; G06F 13/00; G06F 13/1668; G06F 13/1626; G06F 13/30
See application file for complete search history.

(56) References Cited

U.S. PATENT DOCUMENTS

| | | | | |
|---|---|---|---|---|
| 6,167,494 | A * | 12/2000 | Cheston | G06F 11/1417 711/163 |
| 6,609,164 | B1 * | 8/2003 | Kallat | G06F 13/28 710/22 |
| 6,865,660 | B2 | 3/2005 | Duncan | |
| 10,791,132 | B1 * | 9/2020 | Power | H04L 63/0428 |
| 2008/0256290 | A1 | 10/2008 | Souders et al. | |
| 2021/0390047 | A1 * | 12/2021 | Cheng | G06N 20/10 |

* cited by examiner

*Primary Examiner* — Tuan V Thai

(57) ABSTRACT

A method for direct memory access includes: receiving a direct memory access request designating addresses in a data block to be accessed in a memory; randomizing an order of the addresses the data block is accessed; and accessing the memory at addresses in the randomized order. A system for direct memory access is disclosed.

9 Claims, 4 Drawing Sheets

| ACCESS ORDER | STEP-INCREMENTAL ADDRESS | REORDERED ADDRESS |
|---|---|---|
| 1 | 1100000 00 | 1100000 10 |
| 2 | 1100000 01 | 1100000 00 |
| 3 | 1100000 10 | 1100000 11 |
| 4 | 1100000 11 | 1100000 01 |

FIG. 3

| ACCESS ORDER | STEP-INCREMENTAL ADDRESS | REORDERED ADDRESS |
|---|---|---|
| 1 | 1100000 00 | 1100000 11 |
| 2 | 1100000 01 | 1100001 00* |
| 3 | 1100000 10 | 1100001 11* |
| 4 | 1100000 11 | 1100000 10 |
| 5 | - | 1100001 10* |
| 6 | - | 1100000 00 |
| 7 | - | 1100001 11* |
| 8 | - | 1100000 01 |

FIG. 4

| SWITCH MODEL SELECT | OUT [0] | OUT [1] | OUT [2] |
|---|---|---|---|
| 0 | IN[0] | IN[1] | IN[2] |
| 1 | IN[0] | IN[2] | IN[1] |
| 2 | IN[1] | IN[0] | IN[2] |
| 3 | IN[1] | IN[2] | IN[0] |
| 4 | IN[2] | IN[0] | IN[1] |
| 5 | IN[2] | IN[1] | IN[0] |

FIG. 5

| ACCESS ORDER | STEP-INCREMENTAL ADDRESS | REORDERED ADDRESS (WITH SWITCH MODEL 4) |
|---|---|---|
| 1 | 110000 000 | 110000 000 |
| 2 | 110000 001 | 110000 010 |
| 3 | 110000 010 | 110000 100 |
| 4 | 110000 011 | 110000 110 |
| 5 | 110000 100 | 110000 001 |
| 6 | 110000 101 | 110000 011 |
| 7 | 110000 110 | 110000 101 |
| 8 | 110000 111 | 110000 111 |

FIG. 6

SYSTEM AND METHOD FOR DIRECT MEMORY ACCESS

CROSS-REFERENCE TO RELATED APPLICATIONS

This application claims the priority under 35 U.S.C. § 119 of China application no. 202010417550.9, filed on 15 May 2020, the contents of which are incorporated by reference herein.

BACKGROUND

The present disclosure generally relates to a system and method for direct memory access (DMA). More particularly, the present disclosure relates to a system and method for DMA with enhanced security against attacks.

Direct memory access (DMA) allows data to be read from and written into memories without consuming a processor with loads of the actual data access. FIG. 1 shows a modelling system in which a DMA controller operates with a memory. The system 100 includes a processor core 102, a DMA controller 104, and a memory 106. The processor core 102 decides to enter a DMA mode and initiates the DMA controller 104. As a response, the DMA controller 104 requests for accessing a bus 108 and, when granted, starts to read data from the memory 106, or write data into the memory 106, at designated addresses. The access into the memory 106 does not require the processor core 102 to participate.

In a block move mode of the DMA controller, data read and/or write are operated at an order of step incremental addresses within the block. External attacks are able to gather information from timing and energy consumption features of the block move operations. It is desirable to provide a secure DMA system and method.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one embodiment, a method for direct memory access includes: receiving a direct memory access request designating addresses in a data block to be accessed in a memory; randomizing an order of the addresses the data block is accessed; and accessing the memory at addresses in the randomized order.

In another embodiment, a method for direct memory access includes: receiving a direct memory access request designating accessing a memory at addresses in a first order; and accessing the memory at addresses in a second order different from the first order.

In a further embodiment, a system for direct memory access includes a DMA controller and a shuffling unit. The DMA controller receives a direct memory access request. The direct memory access request designates addresses of a memory to be accessed. The shuffling unit randomizes an order of the designated address. The DMA controller accesses the memory at the addresses in the randomized order by the shuffling unit.

BRIEF DESCRIPTION OF THE DRAWINGS

So that the manner in which the above recited features of the present disclosure can be understood in detail, a more detailed description of the disclosure may be had by reference to embodiments, some of which are illustrated in the appended drawings. The appended drawings illustrate only typical embodiments of the disclosure and should not limit the scope of the disclosure, as the disclosure may have other equally effective embodiments. The drawings are for facilitating an understanding of the disclosure and thus are not necessarily drawn to scale. Advantages of the subject matter claimed will become apparent to those skilled in the art upon reading this description in conjunction with the accompanying drawings, in which like reference numerals have been used to designate like elements, and in which:

FIG. 3 is an example table mapping the access order with reordered addresses;

FIG. 4 is another example table mapping the access order with reordered addresses;

FIG. 5 is a switch table according to an embodiment corresponding switch models with altered bit positions in the addresses;

FIG. 6 is an example table showing the reordered addresses according to a switch model of FIG. 5.

DETAILED DESCRIPTION

Figure 1:
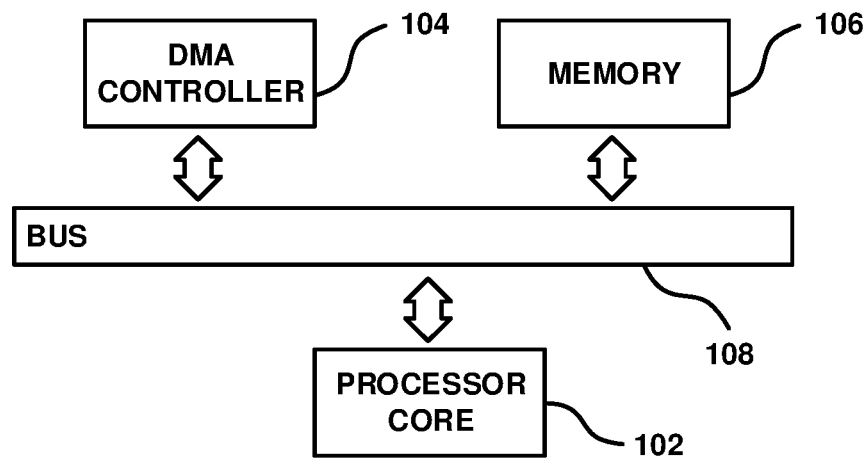
FIG. 1 is a model of a system of a DMA controller interacting with a memory.
Figure 2:
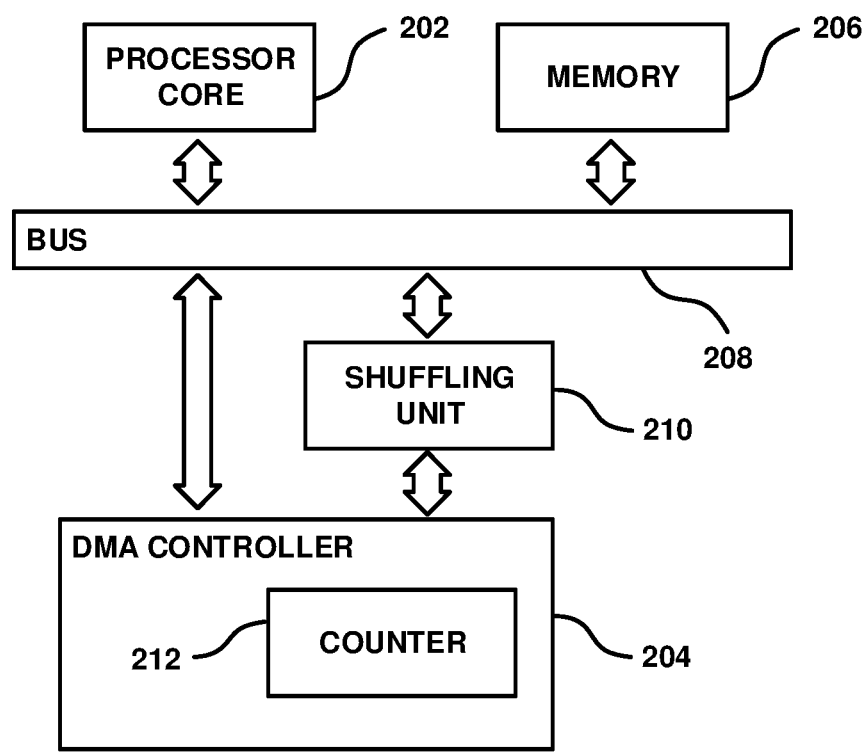
FIG. 2 is a system for direct memory access according to an embodiment.

FIG. 2 shows a system for direct memory access according to an embodiment of the present disclosure. The system 200 includes a processor core 202, a DMA controller 204, and a memory 206 that are similar to those shown in FIG. 1. The DMA controller 204 receives DMA request commands from the processor core 202. The request command from the processor core 202 initiates a DMA-mediated data transfer, and configures the DMA controller 204 for a data access operation, for example to read at least one data block from the memory 206, or to write data into the memory 206. The DMA controller 204 can perform the data access operation by a unit of data word. A data block includes multiple data words with each word being associated with an address in the memory 206. The DMA controller 204 communicates by way of a bus 208 in this embodiment. The bus 208 can be implemented as ARM® Advanced Microcontroller Bus Architecture (AMBA®), Advanced High-performance Bus (AHB), AMBA® Advanced Peripheral Bus (APB), or any other applicable connection suitable to load a corresponding communication protocol.

In response to the DMA request command from the processor core 202, the DMA controller 204 designates addresses from which data is to be read, or into which data is to be written, with each word of the data being associated with, that is to say in this case stored in or written to, an address in the memory 206. The DMA controller 204 may include DMA registers respectively used for setting values to specify, for a particular DMA channel, addresses in the memory 206 to be accessed, and a counter value for the number of data units (i.e. words) to be transferred. The system 200 further includes a shuffling unit 210 connected to the DMA controller 204 and coupled with the bus 208. In alternative embodiments, the shuffling unit 210 is integrated in the DMA controller 204. The shuffling unit 210 randomizes an order of the addresses in the memory 206 that are read from or written into. Being different from the system 100 in FIG. 1 in which a block of data containing multiple words are read or written in a step-incremented address order and accordingly are vulnerable to attacks, the system 200 of the embodiment of FIG. 2 includes the shuffling unit 210 to shuffle the order of the addresses in which the words in the block are to be read or written.

According to an embodiment, the shuffling unit 210 includes a lookup table which maps orders in accessing the memory 206 with reordered addresses. The shuffling unit 210 uses the addresses designated by the DMA controller 204 to generate reordered addresses pursuant to the lookup table. FIG. 3 shows, as a simplified example, a lookup table mapping the access order with reordered addresses for a 4-word sized block in the memory 206, in comparison with step-incremental addresses. It can be seen from the example of FIG. 3 that the word in the memory 206 to be accessed in a first order has the address of "110000010", which would be the third ordered address if accessed by the sequentially incremental address order. The address in the memory 206 to be accesses secondly is "110000000", which would be the first ordered address if accessed in the sequentially incremental address order. The address "110000011" is accessed thirdly, which would be the fourthly accessed address if in the sequentially incremental address order. The address "110000001" is accessed finally in the fourth order, which would be the secondly accessed address if in the sequentially incremental address order. In other embodiments, however, or for another data access request even to the same data block in the memory 206, different and dynamic shuffled access address orders are applicable. The shuffling unit 210 provides a shuffled access into the memory 206, so that the timing and power consumption appear differently to external attacks, and is enhanced security.

The example embodiment of FIG. 3 can be implemented by assigning a randomized order for the addresses to be accessed, or by assigning a randomly selected address from the addresses to be accessed for each accessing order. Note that assigning the addresses or the orders shall ensure that each destinating address is accessed at least once, accordingly there may have repeated addresses being assigned with different orders. The example embodiment of FIG. 3 can also be understood as having implemented a randomization on the least significant bits (LSBs) of the address. According to alternative embodiments, more or less LSBs of the address can be randomized to generate the reordered addresses at that the DMA controller 204 accesses the memory 206. The system 200 can provide different accessing orders of address even for a same data block in the memory 206, thus accesses into identical data blocks have different timings and energy usage patterns, further enhancing the security by appearing different timing and power consumption models.

In another embodiment, preferably in a read operation, the shuffling unit 210 adds dummy addresses to be accessed, to further enhance robustness. Referring to FIG. 4 which shows such an example for accessing a 4-word data block in the memory, besides randomizing the order of the addresses to be accessed, there are added "dummy" addresses in the second, third, fifth, and seventh orders. In this embodiment, accessing to the 4-word block in the memory 206 is expanded to be a seemingly 8-word access in which half of the words accessed (read or written) are dummy data. It can be seen from this embodiment that the number of addresses to be accessed is doubled, appearing as a size of the data block is doubled. However, in alternative embodiment the size scaling can be different, as long as the accessing addresses in the memory 206 do not consecutively increase. It can also be understood that the exemplary embodiment of FIG. 4 randomizes 3 LSBs of the address, by mixing the valid addresses with the "dummy" addresses. In various embodiments, the DMA controller 204 may also be configured to duplicate the access activity. For example, when a certain address bit transits from "0" to "1", the DMA controller 204 duplicates its access activity at the address in the memory 206 identical to that has just been accessed. It is hereby understood that, since less significant bits (LSBs, also referred to as "lower address bits") transit more times than higher significant bits, selection of the certain address bit at transitions of LSBs or MSBs results in different numbers of access activity duplications.

In various embodiments, the DMA controller 204 includes a counter 212. The counter 212 can be implemented as a counter register in which the value can be set by the processor core 202 through the DMA request command. The counter value designates the number of data words to be read from or written into the memory 206. The counter 212 then counts down when a valid word has been read from or written into the memory 206. The counter 212 counting to zero indicates an end of the access into the memory 206 by the DMA controller 204. Note that the access to "dummy" addresses or the duplicated accesses are not counted by the counter 212 because the data accessed is not "valid". Although the "dummy" addresses in the embodiment of FIG. 4 are configured as being different from the valid addresses to be accessed, for example as directing the access to different data blocks or even irrelevant addresses, in alternative embodiments, the valid addresses within the data block being accessed can be repeatedly accessed. Alternatively, the DMA controller 204 is configured to further randomize the access into the memory 206 by setting the value of the counter 212 at a certain time to be a preloaded value to repeat accessing into at least some of the addresses. As an example, for a 4-word data block reading operation from the memory 206, after 3 valid words are read, the DMA controller 204 sets the count value of the counter 212 to be "2", indicating that only 2 of the words are read. The DMA controller 204 then repeat a read operation for the third word.

According to another embodiment, the shuffling unit 210 can be implemented as a switch. FIG. 5 shows a switch table according to an embodiment. The embodiment of the shuffling unit 210 implemented as the switch randomizes, for a given round of access, three LSBs of the designating addresses to be accessed, by altering the positions of the LSBs under a selected switch model. The switch model is selected in response to a data access request from the DMA controller 202. As shown in FIG. 5, for a 3-bit LSB address randomization (corresponding to a 8-word data block access), there are 5 possible reordering switch models by factorial (3)−1, while switch model 0 may provide identical address orders. After a switch model is selected for a data access into the memory 206, the shuffling unit 210 directs the access into the memory 206 with the addresses ordered basing on but differently from the sequentially incremental addresses. The sequentially incremental addresses are provided as inputs into the shuffling unit 210. The shuffling unit 210 provides reordered addresses by altering the LSBs of the input addresses using the selected switch model. After all the 3 LSB addresses are processed and accordingly an access operation into an 8-word data block is concluded, a different switch model can be selected for another data access operation. The selections of the switch models vary by the data blocks to be accessed, and even the same data block may be applied with different switch models.

FIG. 6 shows reordered addresses by the shuffling unit 210 according to the switch table of FIG. 5 when switch model 4 is selected. The first ordered address in the memory 206 to be accessed is "110000000", which is the same as the consecutively incremental address. The second address to be accessed is "110000010", which is generated by altering the 3 LSBs of the second ordered step-incremental address "110000001" using the switch model 4 in that the 3 LSBs "001" of the address are converted into "010". According to the switch model 4 of FIG. 5, the rightmost bit in[0] of the input address is put in the middle of the 3 LSBs as out[1], the middle bit in[1] of the input address is altered to be at the leftmost as bit out[2], and the leftmost bit in[2] of the input address will be the rightmost bit of the reordered address as out[0]. According to the embodiment, the addresses in the memory 206 are accessed by an order different from the step-incremental order. The access into the memory 206 is accordingly robust by appearing differently in timing and power consumption features.

Looking back to the example of FIG. 3, 2 LSBs of the addresses are altered their positions. In other embodiments, the example of FIG. 3 can also be implemented using the switch model selection example of FIG. 6, and more LSBs are applicable to be altered the positions. Although the addresses in the data block are accessed in a "defined" order in the embodiment of FIG. 5 and FIG. 6, given the options of models to be potentially selected, and the number of bits to be altered the positions according to the models, the order of the addresses to be accessed are significantly different from the sequentially incremental order, and the embodiment can still be considered as randomizing the address orders.

Figure 7:
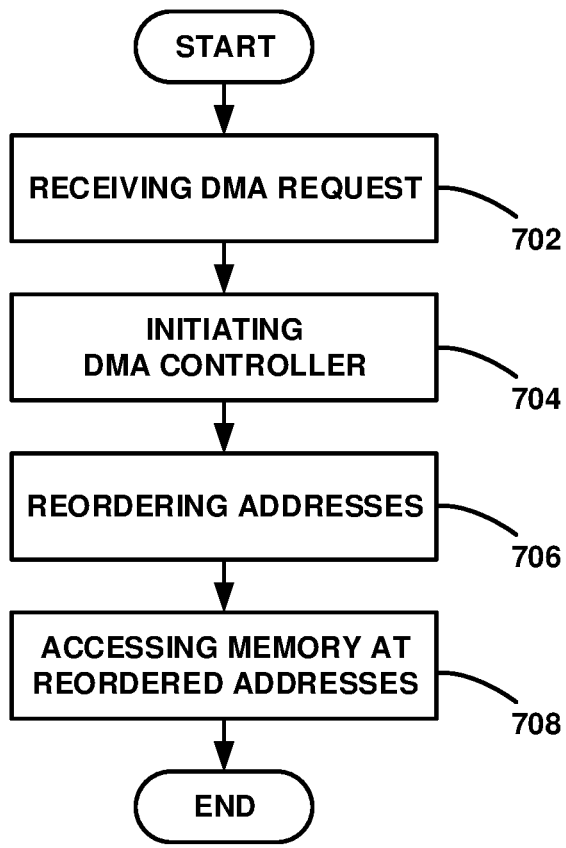
FIG. 7 is a flow diagram of a method for direct memory access according to an embodiment.

FIG. 7 shows a flow diagram of a method for direct memory access according to an embodiment. The method is hereby described with reference to the system 200 of FIG. 2. Step 702, the DMA controller 204 receives, for example by way of the bus 208, a DMA request from the processor core 202. As described above, the DMA request from the processor core 202 can designate target addresses to be accessed in the memory 206, and a size of the data to be accessed. Step 704, as a response to the DMA request from the processor core 202, the DMA controller 204 initiates the DMA operation, by requesting access to the bus 208, setting the counter 212 a value of the size of the data as designated by the DMA request, and initiating the shuffling unit 210 with the target addresses designated by the DMA request. Step 706, the shuffling unit 210 reorders the addresses at that the memory 206 is to be accessed. The shuffling unit 210 can reorder the addresses by the example ways as described above, for example by shuffling the LSBs of the addresses as in FIG. 3, by inserting irrelevant "dummy" addresses as in FIG. 4, by selecting a switch model and alter the address bits as in FIG. 5 and FIG. 6, etc.

At step 708 of the method, the DMA controller 204 accesses the memory 206, at the reordered addresses from the shuffling unit 210. The access to the memory 206 as described in step 708 may be performed in a word-by-word way. Accordingly, the steps 706 of reordering the address and the step 708 of accessing the memory 206 at the reordered addresses may be implemented either consecutively by one-stop reordering the addresses for the whole of the words, or alternately by reordering one address and access into this reordered address.

The "access" mentioned above can be implemented as a read operation which reads data from the memory at the accessing addresses, or a write operation which writes data into the memory at the accessing addresses, or a copy operation with reading data from one memory and write the read data into another memory, or a copy operation within the memory to read data from a first part and write the read data into a second part. The DMA system and method of the embodiments access the memory at addresses in a randomized order, instead of the step-incremental address order. At each round of access into the memory, the system and method guide the access with a randomized address order. Accordingly, the timing feature and energy feature vary even for the access into an identical data block. The data access is secure because it is robust against attacks.

The use of the terms "a" and "an" and "the" and similar referents in the context of describing the subject matter (particularly in the context of the following claims) are to be construed to cover both the singular and the plural, unless otherwise indicated herein or clearly contradicted by context. The terms "coupled" and "connected" both mean that there is an electrical connection between the elements being coupled or connected, and neither implies that there are no intervening elements. In describing transistors and connections thereto, the terms gate, drain and source are used interchangeably with the terms "gate terminal", "drain terminal" and "source terminal". Recitation of ranges of values herein are intended merely to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the disclosure as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A method for direct memory access, wherein the method comprises:
   receiving a direct memory access request designating addresses in a data block to be accessed in a memory;
   randomizing an order of the addresses the data block is accessed; and
   accessing the memory at addresses in the randomized order, wherein randomizing the order of the addresses comprises:
  selecting a model in response to the received direct memory access request; and
  altering positions of least significant bits in each address to be accessed in the memory using the selected model.

2. The method of claim 1, wherein the model is selected from a plurality of models each configured to alter positions of bits in the addresses to be accessed in the memory.

3. The method of claim 1, wherein randomizing the order of the addresses comprises: assigning a corresponding random accessing order for each address to be accessed in the memory.

4. The method of claim 3, wherein randomizing the order of the addresses comprises: inserting dummy addresses between the designated addresses to be accessed in the memory.

5. The method of claim 1, wherein the accessing the memory at addresses in the randomized order comprises one of more of: reading data from the memory, and writing data into the memory.

6. The method of claim 1, wherein the accessing the memory at addresses in the randomized order comprises one or more of: copying data from a first memory to a second memory, and copying data from a first part of the memory to a second part of the memory.

7. A system for direct memory access, wherein the system comprises:
  a DMA controller configured to receive a direct memory access request, wherein the direct memory access request designates addresses of a memory to be accessed; and
  a shuffling unit configured to randomize an order of the designated address;
    wherein the DMA controller is further configured to access the memory at the addresses in the randomized order by the shuffling unit,
  wherein the shuffling unit is configured to apply a switch model on the designated addresses to alter positions of least significant bits in each designated address.

8. The system of claim 7, wherein the shuffling unit is configured to randomize the order of the designated address by assigning a random accessing order for each designated address.

9. The system of claim 7, wherein the shuffling unit is configured to add at least a dummy address into the designated addresses in response to the direct memory access request designates to read data from the memory.

* * * * *